United States Patent
Saha et al.

(10) Patent No.: US 11,025,337 B2
(45) Date of Patent: Jun. 1, 2021

(54) SIGNAL CONVERSION IN COMMUNICATIONS SATELLITES

(71) Applicant: Airbus Defence and Space Limited, Stevenage (GB)

(72) Inventors: Mrinal Saha, Stevenage (GB); Nicola Porecki, Portsmouth (GB); Shah Irani, Portsmouth (GB); Glyn Thomas, Portsmouth (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 14/379,260

(22) PCT Filed: Feb. 15, 2013

(86) PCT No.: PCT/EP2013/053142
§ 371 (c)(1),
(2) Date: Aug. 15, 2014

(87) PCT Pub. No.: WO2013/121030
PCT Pub. Date: Aug. 22, 2013

(65) Prior Publication Data
US 2015/0139070 A1    May 21, 2015

(30) Foreign Application Priority Data
Feb. 16, 2012    (EP) ..................................... 12275015

(51) Int. Cl.
*H04B 7/185*    (2006.01)
*H04B 1/28*    (2006.01)

(52) U.S. Cl.
CPC ........... *H04B 7/18584* (2013.01); *H04B 1/28* (2013.01); *H04B 7/18515* (2013.01)

(58) Field of Classification Search
CPC ... H04B 1/28; H04B 1/26; H04B 1/30; H04B 7/18515; H04B 7/18584; H04B 1/006;
(Continued)

(56) References Cited

U.S. PATENT DOCUMENTS 4,045,740 A * 8/1977 Baker ...................... H03G 5/14
455/266
4,228,401 A * 10/1980 Wachs ................. H04B 7/2041
342/352

(Continued)

FOREIGN PATENT DOCUMENTS

JP    2000-286771    10/2000
JP    2006-050205    2/2006

(Continued)

OTHER PUBLICATIONS

International Search Report and Written Opinion dated Jun. 27, 2013 in connection with corresponding PCT Application No. PCT/EP2013/053142.

*Primary Examiner* — Ricardo H Castaneyra
(74) *Attorney, Agent, or Firm* — Chang & Hale LLP (57) ABSTRACT

Apparatus for use in a communications satellite can include a first mixer arranged to mix and down-convert a received signal in an input frequency range with a first local oscillator LO signal so that a signal within the received signal at a center frequency of a first frequency range is converted to an intermediate frequency IF, a bandpass filter having a passband with a center frequency at the IF arranged to filter the mixed signal such that the filter bandwidth defines the width of the first frequency range, and a second mixer arranged to mix the filtered IF signal with a second LO signal to up-convert the IF signal to an output frequency range. One of the first and second LO signals is a mixed LO signal obtained by mixing the other one with a third LO signal, and (Continued)

the output frequency range is different from the input frequency range.

13 Claims, 5 Drawing Sheets

(58) Field of Classification Search
CPC ...... H04B 1/0057; H04B 1/1036; H04B 1/38;
H04B 1/109; H04B 7/18513; H04B
2001/1054; H04W 24/08
See application file for complete search history.

(56) References Cited

U.S. PATENT DOCUMENTS

| | | | |
|---|---|---|---|
| 4,262,361 A | 4/1981 | Hauer | |
| 4,901,310 A * | 2/1990 | Ichiyoshi | H04B 7/2045 370/307 |
| 5,465,410 A * | 11/1995 | Hiben | H03G 5/24 455/182.2 |
| 6,442,148 B1 * | 8/2002 | Adams | H04B 7/2041 342/356 |
| 6,600,906 B1 | 7/2003 | Roppongi | |
| 6,741,847 B1 * | 5/2004 | Claxton | H03D 7/163 455/207 |
| 2003/0134635 A1 * | 7/2003 | Lane | H04B 7/18515 455/428 |
| 2007/0015479 A1 * | 1/2007 | Park | H04B 1/30 455/179.1 |
| 2007/0041434 A1 | 2/2007 | Park et al. | |
| 2008/0207118 A1 * | 8/2008 | Fenech | H04B 7/18515 455/12.1 |
| 2009/0156155 A1 * | 6/2009 | Krug | H04B 1/28 455/313 |
| 2010/0285761 A1 * | 11/2010 | Morris | H04B 1/26 455/113 |
| 2012/0002701 A1 * | 1/2012 | Morris | H04B 1/707 375/130 |
| 2015/0312785 A1 * | 10/2015 | Jagger | H04B 1/1036 370/252 |

FOREIGN PATENT DOCUMENTS

| | | |
|---|---|---|
| JP | 2008-518495 | 5/2008 |
| WO | WO/1997/045969 | 12/1997 |
| WO | 2006/043115 A1 | 4/2006 |
| WO | WO/2009/083499 | 7/2009 |
| WO | 2011/120986 | 10/2011 |

* cited by examiner

SIGNAL CONVERSION IN COMMUNICATIONS SATELLITES

FIELD OF THE INVENTION

The present invention relates to converting signals in a communications satellite. In particular, the present invention relates to down-converting a received signal to an intermediate frequency IF using a first local oscillator LO signal, filtering the IF signal to select signals within the received signal, and up-converting the filtered signal to an output frequency using a second LO signal, one of the first and second LO signals being a mixed LO signal obtained by mixing the other one of the first and second LO signals with a third LO signal.

BACKGROUND OF THE INVENTION

Communications satellites can be arranged to use different frequency bands for transmission and reception to avoid interference between incoming and outgoing signals. In this case, signals received in the uplink band must be converted to an appropriate frequency in the downlink band before they are transmitted. In digital systems, received analogue signals are converted into the digital domain by analogue-to-digital converters (ADC), and the digital signals are processed as required in a digital signal processing module. The processed, i.e. frequency-converted, digital signals are sent to a digital-to-analogue converter (DAC) for conversion back into the analogue domain before transmission and could be designed to provide flexibility in channel routing. However, the digital signal processing systems are not suitable for use at large bandwidths.

Analogue systems for flexibly routing and converting signals are also well-known in the art, and fall into two distinct categories. The first category uses a waveguide switch matrix of $N_i \times N_o$ dimensions to switch signals between $N_i$ input ports and $N_o$ output ports. Such switch matrixes are large and add significant mass to the payload of the satellite, and become impractical when there are a large number of ports, for example a large number of downlink (user) beams to be formed. The second category uses several filter and mixing stages to sequentially remove unwanted high- and low-frequency signals, in order to isolate signals in a particular frequency band. An example of a system is disclosed in U.S. Pat. No. 4,228,401. These systems suffer from relatively high phase noise due to the use of several local oscillator LO signals.

The invention is made in this context.

SUMMARY OF THE INVENTION

According to the present invention, there is provided an apparatus for use in a communications satellite to select signals in a first frequency range from a multiplexed signal received in an input frequency range, the apparatus comprising a first mixer arranged to mix the received signal with a first local oscillator LO signal to down-convert the received signal so that a signal within the received signal at a centre frequency of the first frequency range is converted to the IF, a bandpass filter arranged to filter the mixed signal such that the filter bandwidth defines the width of the first frequency range, the bandpass filter having a passband with a centre frequency at the IF, and a second mixer arranged to mix the filtered IF signal with a second LO signal to up-convert the IF signal to an output frequency range different to the input frequency range, wherein the first LO signal is controllable to change the frequency that is converted to the intermediate frequency by the mixer, to select a different frequency range as the first frequency range, and wherein one of the first and second LO signals is a mixed LO signal obtained by mixing the other one of the first and second LO signals with a third LO signal. Because a mixed LO signal is used for upconversion or downconversion, one of the first and second LO signals is used in both the downconversion and upconversion steps. This has the result that phase noise introduced by said one of the first and second LO signals during downconversion/upconversion is substantially cancelled during upconversion/downconversion, reducing the phase noise in comparison to prior art systems that use a plurality of LO signals.

The second LO signal may be controllable to change the output frequency range to which the IF signal is up-converted.

The bandwidth of the bandpass filter may be arranged to be adjustable to change the width of the first frequency range in which signals are selected.

The bandpass filter may be arranged to be switchable between a plurality of predetermined bandwidths to adjust the filter bandwidth.

The apparatus may further comprise a channel amplifier arranged to amplify the filtered IF signal before the filtered IF signal is up-converted to the output frequency range.

According to the present invention, there is also provided a system for use in a communications satellite to flexibly route signals from a received multiplexed signal to a plurality of downlink beams, the system comprising a plurality of frequency-conversion modules each comprising the apparatus, an input stage arranged to send the received signal to the plurality of frequency-conversion modules, a plurality of amplifiers, each connected to at least one of the frequency-conversion modules to amplify the upconverted signal output by the at least one frequency-conversion module, and an output stage arranged to receive the amplified converted signals and form the plurality of downlink beams, each downlink beam including one or more of the amplified converted signals. Because each frequency-conversion module receives the received signal, and can select signals from any frequency range within the received signal, the system can flexibly route signals from any uplink beam to any downlink beam, without the need for a complex waveguide switch matrix.

The plurality of amplifiers may be variable-power amplifiers, each arranged to amplify a converted signal output by one of the plurality of frequency-conversion modules to a transmit power level according to a bandwidth occupancy of the converted signal. This allows available power in the satellite to be shared between downlink beams depending on the bandwidth occupancy of each beam.

The output stage may further comprise a demultiplexer DEMUX including an input and a plurality of outputs, the DEMUX input being arranged to receive one of the converted signals and each DEMUX output being connected to a different one of the downlink beams, such that said one of the converted signals can be routed to the downlink beam connected to one of the DEMUX outputs by controlling one of the frequency-conversion modules to tune the converted signal to a passband frequency range of said one of the DEMUX outputs, and/or an output multiplexer OMUX including a plurality of inputs and an output, the OMUX output being connected to one of the downlink beams and each OMUX input being arranged to receive one of the converted signals from a different one of the frequency-conversion modules, such that a plurality of the converted signals can be combined and transmitted in the downlink beam connected to the OMUX output. The use of an OMUX connected to the downlink beam allows one or more channels to be flexibly inserted anywhere within the unoccupied part of an output band segment in the downlink beam, in addition to an initial bandwidth allocation.

The plurality of frequency-conversion modules may include a plurality of first frequency-conversion modules arranged to receive a first received signal and a plurality of second frequency-conversion modules arranged to receive a second received signal, the system further comprising means for combining the converted signal output by one of the first frequency-conversion modules with the converted signal output by one of the second frequency-conversion modules and sending the combined signal to one of the plurality of amplifiers. Combining the output signals allows spectrum sharing between different sources and/or polarisations, since a user beam that receives the combined signal can utilise bandwidth in both the first received signal and the second received signal.

The input stage may be arranged to separate the received signal into the first and second received signals, the first received signal being a polarised signal and the second received signal being a signal having an opposite polarisation to the first received signal. In this case, spectrum sharing between the opposite polarisations is possible.

The input stage may comprise at least one antenna arranged to receive the first received signal from a first source and the second received signal from a second source. In this case, spectrum sharing between the plurality of sources is possible, for example between a plurality of gateways.

The output stage may include an antenna for forming one of the downlink beams and a filter arranged to filter one of the amplified signals and send the filtered amplified signal to the antenna, the filter having a first bandwidth, and the amplified signal may be a signal received from one of the frequency-conversion modules arranged to filter the IF signal with a second bandwidth smaller than the first bandwidth, such that the frequency-conversion module can be controlled to retune the output frequency within the first bandwidth range of said one of the downlink beams.

The output stage may include a flexible frequency-reuse module connecting a first plurality of the frequency-conversion modules to a first plurality of the downlink beams such that the first plurality of frequency-conversion modules can be retuned to change a frequency reuse pattern of the first plurality of downlink beams, the flexible frequency-reuse module comprising a plurality of demultiplexers DEMUXes each including a plurality of outputs and an input connected to one of the first plurality of frequency-conversion modules, and a plurality of output multiplexers OMUXes each including a plurality of inputs and an output connected to one of the first plurality of downlink beams, wherein the DEMUX outputs and the OMUX inputs are connected such that each DEMUX is connected to each one of the OMUXes. The flexible-frequency reuse module can enable the frequency reuse pattern of the first plurality of downlink beams to be changed in-orbit, by retuning the first plurality of frequency-conversion modules to direct signals of different output frequencies to different ones of the antennae.

The output stage may include at least one antenna for forming the downlink beams, the at least one antenna being arranged to be reconfigurable or steerable to redirect the downlink beams.

According to the present invention there is further provided a method for use in a communications satellite to convert signals in a first frequency range to an output frequency range, the method comprising receiving a multiplexed signal in an input frequency range, mixing the received signal with a first LO signal so that a signal within the received signal at a centre frequency of the selected frequency range is down-converted to an intermediate frequency IF, filtering the IF signal using a passband such that the passband width defines the width of the first frequency range, the passband having a centre frequency at the IF, mixing the filtered IF signal with a second LO signal to up-convert the filtered signal to an output frequency range different to the input frequency range, and controlling the first LO signal to change the frequency that is converted to the intermediate frequency, to select a different frequency range as the first frequency range, wherein one of the first and second LO signals is a mixed LO signal obtained by mixing the other one of the first and second LO signals with a third LO signal.

BRIEF DESCRIPTION OF THE DRAWINGS

Embodiments of the present invention will now be described, by way of example only, with reference to the accompanying drawings, in which.

DETAILED DESCRIPTION

Figure 1:
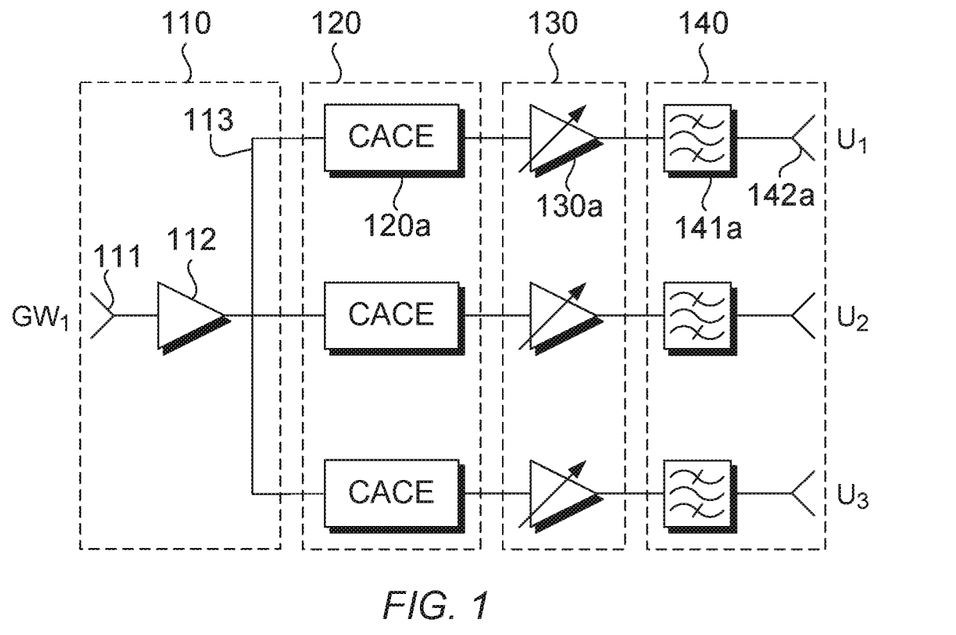
FIG. 1 illustrates a system for routing signals from a received multiplexed signal to a plurality of downlink beams in a communications satellite, according to an embodiment of the present invention.

Referring now to FIG. 1, a system for routing signals from a received multiplexed signal to a plurality of downlink beams in a communications satellite is illustrated, according to an embodiment of the present invention. The system shown in FIG. 1 is provided for illustrative purposes only, and has been simplified so as not to obscure the principles of the invention.

The system comprises an input stage 110, a signal-converting stage 120, an amplifying stage 130, and an output stage 140. The input stage 110 comprises an antenna 111 connected to a low-noise amplifier (LNA) 112. The antenna 111 is arranged to receive an uplink signal, for example from a ground-based transmitter of a service provider. In the present example, the received signal is a gateway signal $GW_1$ received from a gateway. The received signal $GW_1$ is a multiplexed signal including signals across a large frequency range, and may be referred to as a broadband signal. The LNA 112 amplifies the received signal, which may be received at a very low power level. The input stage 110 further comprises a signal splitter 113 connected to the LNA 112. The signal splitter 113 splits the amplified received signal into a plurality of identical signals, each of which includes all frequencies in the received signal.

The signal-converting stage 120 includes a plurality of frequency-conversion modules 120a, which hereinafter will be referred to as channel agile conversion equipment (CACEs). The plurality of CACEs 120 are connected to the signal splitter 113 of the input stage 110 so that each CACE 120a receives the same signal as the other CACEs, i.e. each CACE receives the amplified received signal. Each CACE 120a is adapted to select signals from a first frequency range within the received signal and convert the selected signals to a desired output frequency band. In particular, each CACE is arranged to down-convert the received signal to an intermediate frequency (IF) by mixing with a local oscillator (LO) signal obtained by mixing first and second LO signals, and up-convert the IF signal to the output frequency band by mixing with the second LO signal. The IF signal can be passed through a bandpass filter to select the wanted signals, i.e. those signals within the first frequency range in the received signal.

Because the second LO signal is used for both upconversion and downconversion, any phase noise introduced by the second LO signal during the downconversion is effectively cancelled when the IF signal is mixed again with the second LO signal during the upconversion. Specifically, in downconversion the frequency difference between the LO signal and an input signal is used, whereas in upconversion the frequency sum is used. Therefore the phase noise introduced by the signal-converting stage 120 is reduced in comparison to systems using a plurality of LOs, since in the present embodiment the overall phase noise contribution of the CACE is primarily due to the contribution of the first LO signal only.

The output signals from the signal-conversion stage 120, i.e. the signals converted to the output frequency bands by the plurality of CACEs, are sent to the amplifying stage 130 which comprises a plurality of variable-power amplifiers 130a for amplifying each converted signal to a desired transmit power. The use of variable-power amplifiers allows the transmit power of each amplified signal to be controlled according to the bandwidth occupancy of that signal. The variable power amplifiers may be variable Travelling Wave Tube Amplifiers (Flex TWTA), or could be another type of variable high power amplifier such as Multi-Port Amplifiers (MPAs).

Finally, the amplified signals are sent to the output stage 140, which comprises a plurality of output filters 141a and at least one antenna 142a for forming a plurality of downlink beams $U_1$ to $U_3$. The antennae of the output stage 140 could be reconfigurable/steerable antennae to allow any given downlink beam to be redirected during use of the satellite, or could be non-reconfigurable/non-steerable. Each downlink antenna 142a can form one or more of the downlink beams $U_1$, $U_2$, $U_3$. In FIG. 1 a separate antenna is shown for each downlink beam for clarity, but in practice it is not necessary to provide a physically separate antenna for each beam. For example, the three downlink beams $U_1$, $U_2$, $U_3$ of FIG. 1 could be formed by a single antenna. Also, although in FIG. 1 only three downlink beams are shown, in general any number of downlink beams may be provided.

In the present example, the system is arranged for use in the forward payload section of the satellite, for routing signals from the gateway (e.g. a service provider) to end users, and so the downlink beams may be referred to as user beams. Each user beam may be received by any number of users within an area covered by the user beam. In other embodiments a similar system may be adapted for use in the return payload section, wherein a plurality of uplink signals are received from a plurality of users and the downlink beam is a multiplexed beam to be sent to the gateway.

As shown in FIG. 1, each downlink beam is connected to a particular CACE 120a via an amplifier 130a and filter 141a. The configuration of the output stage 140 can be fixed, i.e. the physical connections between CACEs, amplifiers, filters and downlink beams may not be able to be reconfigured after launch of the communications satellite. Also, the range of frequencies that can be included within any given user beam $U_1$, as an example, is determined by the bandwidth and centre frequency of the bandpass filter 141a connected to the user beam $U_1$. The CACE 120a connected to the downlink beam $U_1$ should therefore be arranged to output the converted signal in an output frequency range within the passband of the filter 141a. Nevertheless, because each CACE receives the same input signal including all frequencies within the received uplink signal, and can select input signals at any frequency range within the received signal by controlling the LO frequency used for downconversion, the system can flexibly route any of the signals in the received beam to any given downlink beam. This simplifies the construction of the satellite in comparison to prior art solutions which require complex waveguide switching networks to direct any given input signal to any given output signal.

Figure 2:
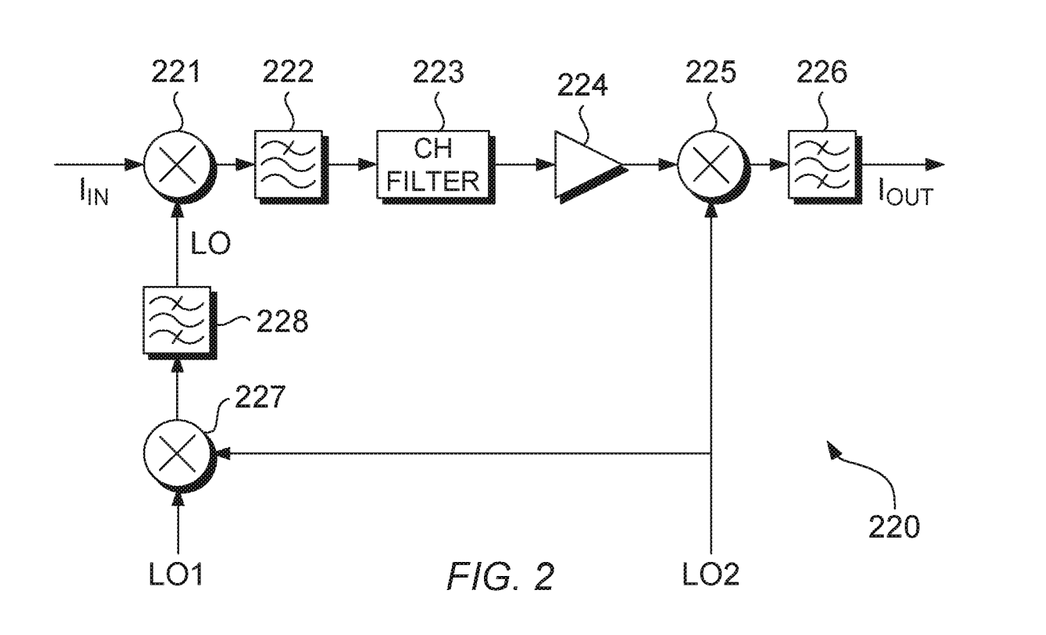
FIG. 2 illustrates apparatus for use as a frequency-conversion module in the system of FIG. 1, according to an embodiment of the present invention.

Referring now to FIG. 2, apparatus for use as a frequency-conversion module in the system of FIG. 1 is illustrated, according to an embodiment of the present invention. The apparatus can be used in the communications satellite to select signals in the first frequency range from a received broadband signal, i.e. a received signal that includes signals within the first frequency range and also at other frequencies. The apparatus can select the signals from the first frequency range and convert the selected signals to the desired output frequency range for transmission in the particular downlink beam connected to the apparatus. Hereinafter, the apparatus of FIG. 2 will be referred to as a CACE. It should be understood that the present invention is not limited to the specific structure shown in FIG. 2, and other arrangements may be possible that can provide a similar functionality.

As shown in FIG. 2, in the present embodiment the CACE 220 comprises a first mixer 221, a low-pass filter 222, a channel filter 223, a channel amplifier 224, a second mixer 225, and an output filter 226, which are connected in series. The CACE further comprises a third mixer 227 and bandpass filter 228 for providing an LO signal to the first mixer 221. Specifically, the first mixer 221 is arranged to convert the received signal $I_{IN}$, i.e. the signal received from the input stage, to the intermediate frequency (IF) by mixing the received signal $I_{IN}$ with the local oscillator signal LO. The converted signal, which may be referred to as the IF signal, is then filtered by the channel filter 223 and amplified by the channel amplifier 224 to set the channel basis gain, before being converted from the IF to an output signal $I_{OUT}$ at the required output frequency range by the second mixer 225.

The output filter 226 removes unwanted mixing products generated by the second mixer 225. The channel amplifier 224 allows the channel gain to be set independently of other channel gains applied by other CACEs in the system.

As described above, the received signal $I_{IN}$ includes signals in the first frequency range, i.e. the frequency range from which signals are to be selected, and can also include signals at other frequencies outside of the first frequency range. For example, if the received signal $I_{IN}$ includes signals in the frequency range 27.5 to 29.5 Gigahertz (GHz), the first frequency range from which signals are to be selected could be a range from 27.5 to 27.75 GHz, or could be another frequency range between 27.5 and 29.5 GHz. For the example of 27.5 to 27.75 GHz, the first frequency range has a centre frequency of 27.625 GHz and a bandwidth of 250 MHz. These flexible selections of frequency ranges are only exemplary, and embodiments of the present invention may be used at any frequencies.

An output of the first mixer 221 includes signals at both the sum and the difference of the frequencies of the mixed signals $I_{IN}$ and LO. In the present embodiment the output of the first mixer 221 is passed through the low-pass filter 222 to remove the unwanted mixing product, in this case the higher-frequency signals including signals with the sum of the input frequencies, LO signals or its harmonics. That is, in the present embodiment the wanted signal from the first mixer 221 is the down-converted signal, i.e. the mixing product at the difference between the $I_{IN}$ and LO frequencies.

By mixing the input signal $I_{IN}$ with the LO signal, the input signal can be down-converted to the IF for further processing within the CACE. In the present embodiment, an IF of 2.3 GHz is used, but other IFs may be used in other embodiments. After down-conversion to the IF, the converted signal is then filtered by the channel filter 223 to remove any signals at unwanted frequencies in the received signal, i.e. frequencies outside the first frequency range. The bandwidth of the channel filter 223 defines the bandwidth of the first frequency range from which signals are selected, and the centre frequency of the channel filter 223 (i.e. the IF, 2.3 GHz) defines the position of the first frequency range within the received signal. That is, a different frequency range within the received signal can be selected by controlling the LO signal input to the first mixer 221, so that a different frequency in the received signal is downconverted to the IF. Together, the first mixer 221 and channel filter 223 allow the CACE to select any frequency range within the received signal $I_{IN}$, and remove signals on other frequencies from the input signal $I_{IN}$.

In the present example, the first frequency range, i.e. the range in the received signal from which signals are to be selected, is 27.5 to 27.75 GHz. After down-conversion to a centre frequency IF of 2.3 GHz, signals from the first frequency range, i.e. 27.5 to 27.75 GHz, will now lie in the range 2.175 to 2.425 GHz. That is, the centre frequency of the first frequency range has been down-converted from 27.625 GHz to 2.3 GHz, which requires an LO signal of 25.325 GHz to be input to the first mixer 221.

Furthermore, in some embodiments the bandwidth of the channel filter 223 passband can be adjusted to enable the width of the first frequency range to be varied. Depending on the structure of the channel filter 223, the bandwidth may be selected from a plurality of predetermined bandwidths. For example, in one embodiment the channel filter may include three distinct filters, one having a passband width of 125 MHz, one having a passband width of 250 MHz, and one having a passband width of 500 MHz. The passband of each filter is centred at the IF. The channel filter can be switchable between each filter to select an appropriate bandwidth as required.

Continuing with reference to FIG. 2, the amplified and filtered signal at the IF is up-converted to the required output frequency range by the second mixer 225. Since the output frequency range is different to the first frequency range, i.e. the frequency range of the selected signals in the received signal, the second mixer 225 requires a different LO signal to the LO signal supplied to the first mixer 221. The CACE 220 is arranged to receive a first LO signal LO1 and a second LO signal LO2, and apply the second LO signal LO2 directly to the second mixer 225 to up-convert the channel signal at the IF to the output frequency range. Therefore the second LO signal LO2 should have a frequency corresponding to the difference between the centre frequency of the output frequency range and the IF. In the present example, the required output frequency range is 19.7 to 19.95 GHz and the IF is 2.3 GHz, meaning that the second LO signal LO2 should have a frequency of (19.95−19.7)/2+19.7−2.3=17.525 GHz.

Additionally, in the present example an LO signal of 25.325 GHz is required for the down-conversion by the first mixer 221, as described above. Therefore to obtain this LO signal by mixing the first LO signal LO1 with the second LO signal LO2 of 17.525 GHz, the first LO signal LO1 could have a frequency of 25.325−17.525=7.8 GHz, in which case the wanted mixing product of the third mixer 227 is the sum of the LO1 and LO2 frequencies. Alternatively, LO1 could have a frequency of 25.325+17.525=42.85 GHz, in which case the wanted mixing product is the difference between the LO1 and LO2 frequencies. The second bandpass filter 226 removes the unwanted mixing product.

The use of local oscillators in this way provides substantial freedom in the CACE's ability to selectively route and convert signals within the communications satellite. For example, the second LO signal LO2 can be adjusted to change the output frequency range, i.e. the frequency range of the output signal $I_{OUT}$ to be sent to the transmit beam. At the same time, the first LO signal LO1 can be correspondingly adjusted so that the signal LO applied to the first mixer 221 remains constant so that the same input frequencies are selected. Alternatively, the second LO signal LO2 can be held constant to keep the same output frequency range, while the first LO signal LO1 can be adjusted to change the signal LO applied to the first mixer 221, in order to select a different frequency range from the input signal $I_{IN}$. Still further, both the first and second LO signals LO1, LO2 can be adjusted together to simultaneously change both the first frequency range and the output frequency range. Therefore the CACE can, in general, select any input frequency range, convert signals in the selected frequency range to the IF, amplify the IF signal, and convert the amplified IF signal to any given output frequency range.

The CACE may generate one or both LO signals LO1, LO2 itself, or may receive the signals from a separate LO generator. For instance, the satellite could further include a dedicated LO generator separate from the CACE, which generates the LO signals LO1, LO2 to be sent to the CACE and is controllable to change the frequency of one or both signals.

Figure 3:
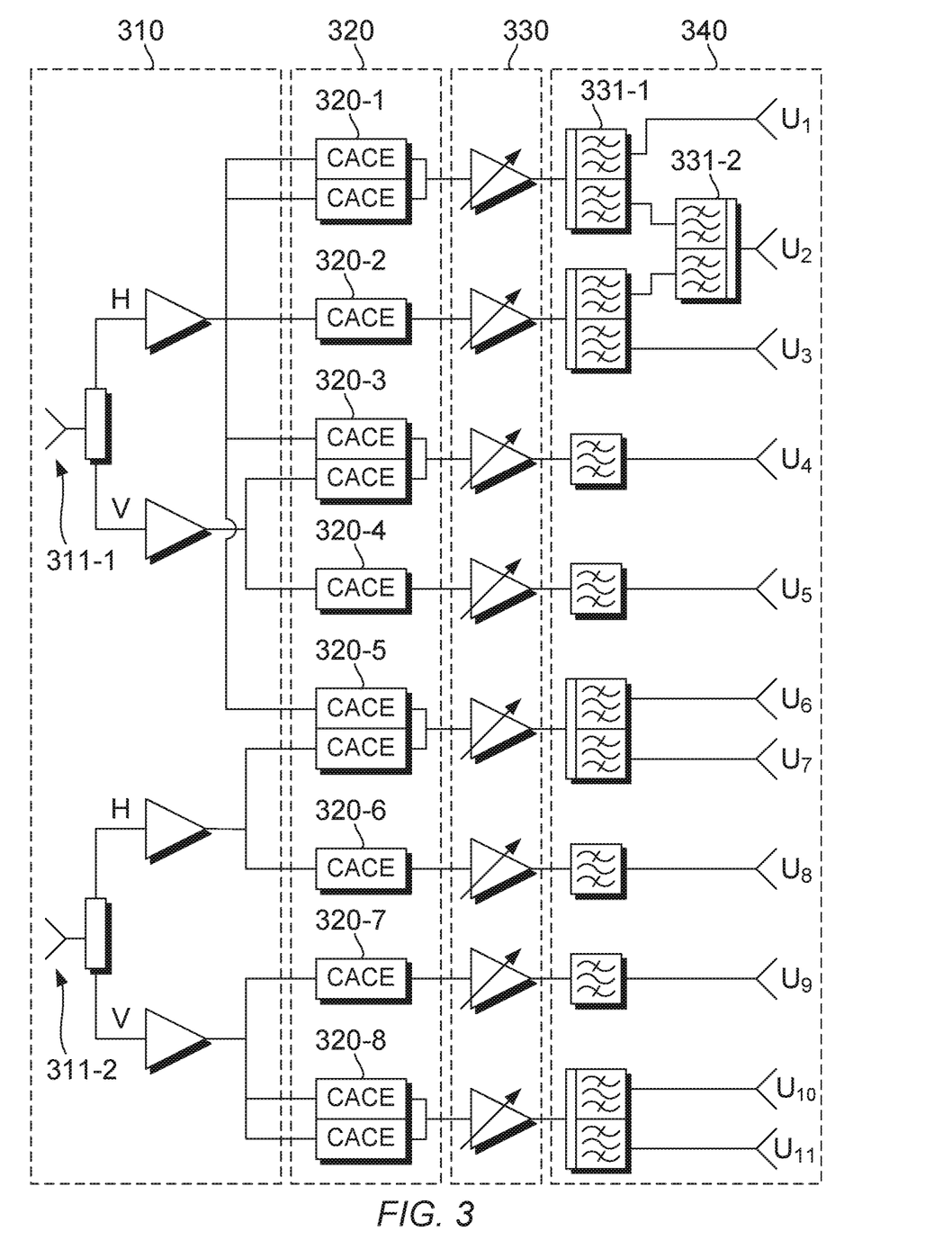
FIG. 3 illustrates a system for routing signals from a received multiplexed signal to a plurality of downlink beams in a communications satellite according to a further embodiment of the present invention.

Although FIG. 1 illustrates a system in which each CACE feeds a single downlink beam, and each downlink beam receives a signal from only a single CACE, more complex arrangements are also possible. A further example of a system for routing signals from a received multiplexed signal to a plurality of downlink beams in a communications satellite is illustrated in FIG. 3, according to an embodiment of the present invention. The system of FIG. 3 is similar in many respects to the system of FIG. 1, and as such a detailed description of similar aspects will be omitted here. However, unlike the system of FIG. 1, the system of FIG. 3 includes an input stage 310 having two receive antennae 311-1, 311-2 for receiving two uplink GW signals. Also, the signal received by each antenna 311-1, 311-2 is split into horizontally and vertically polarized signals H, V to be amplified by LNAs and sent to the CACE modules 320-1, 320-2, 320-3, 320-4, 320-5, 320-6, 320-7, 320-8. Although horizontal and vertical polarisations are used in FIG. 3, in general the signal may be split into polarised signals having opposite polarisations. For example, opposite circular polarisations could be used instead of horizontal and vertical polarisation. Similarly, the present invention is applicable to a plurality of uplink signals, not only two as shown in FIG. 3. Although in the present embodiment a separate receive antenna 311-1, 311-2 is provided for each uplink signal, in other embodiments a plurality of receive antennae or one receive antenna forming a plurality of receive beams could receive signals from a plurality of sources.

The system further comprises a signal-converting stage 320 including a plurality of CACE modules. In FIG. 3, the second, fourth, sixth and seventh CACE modules 320-2, 320-4, 320-6, 320-7 are similar to those previously described in FIGS. 1 and 2. However, the first, third, fifth and eighth modules 320-1, 320-3, 320-5, 320-8 comprise paired CACEs, each of which is similar to the individual CACEs shown in FIGS. 1 and 2. In the paired CACE modules 320-1, 320-3, 320-5, 320-8, the converted signals outputted by the two CACE modules are combined and the combined signal is sent to one of the variable-power amplifiers in the amplifying stage 330. Suitable means for combining the signals could include one or more hybrid couplers, or a combiner. A paired CACE module can, for example, be used to combine signals from the same gateway and of the same polarization, as is the case for the first and eighth CACE modules 320-1, 320-8 of FIG. 3. Alternatively, a paired CACE module could be used to combine signals of opposite polarizations from the same gateway, as in the third CACE module 320-3 of FIG. 3, signals of the same polarization from different gateways, as in the fifth CACE module 320-5 of FIG. 3, or signals of opposite polarisations from different gateways. An example of spectrum sharing by combining the outputs of CACEs will now be described. Furthermore, combining the outputs of two or more CACEs can enable flexible utilization of satellites resources in order to meet the variation in capacity demands of particular user beams during the satellite operations. Considering an example of six user beams $U_1$ to $U_6$ of the receive antenna 311-1 in FIG. 3, bandwidth may be initially assigned to the beams in a Gateway in two polarisations as follows. In the first polarisation, which is the horizontal (H) polarisation in FIG. 3, 500 MHz is allocated to beam $U_1$, 125 MHz is allocated to beam $U_2$, 125 MHz is allocated to beam $U_3$, and 125 MHz is allocated to beam $U_6$. In the second polarisation, which is the vertical (V) polarisation in FIG. 3, 375 MHz is allocated to beam $U_4$, and 500 MHz is allocated to beam $U_5$. Therefore a total capacity of 1750 MHz is initially allocated across both polarisations. In the present example, the power and the capacity sharing between the beams are to be such that the total capacity assigned to these beams, i.e. 1750 MHz, and also the satellite equivalent isotropically radiated power (EIRP) density (eirp/MHz) to support the total assigned capacity of 1750 MHz must not be exceeded. In use, it may be the case that beam $U_4$, for instance, needs 500 MHz capacity, and beam $U_1$ is only utilising 250 MHz out of its 500 MHz allocated capacity. In this case, the unused part of the bandwidth allocated to $U_1$ could be utilised by $U_4$. To achieve this, a paired CACE module connected to beam $U_4$, for example, must be arranged to receive both polarisations to allow spectrum sharing between the polarisations in beam $U_4$.

In the above-described example, as the occupied bandwidth of a user beam increases, a variable-power amplifier can increase the transmit power according to the occupied bandwidth, i.e. the available power can be shared between the user beams depending on the bandwidth occupation of the beams. Therefore the use of CACEs having agile frequency translation functionality in conjunction with variable-power amplifiers, allows the underutilized input spectrum and power available in $U_1$ in the first polarisation to be transferred to or shared with the beam $U_4$ in the second polarisation in which there is inadequate input spectrum to support its traffic demands. Here, 125 MHz is the transferable additional bandwidth as an example. However, in other embodiments the maximum selectable channel bandwidth by a CACE may be different.

Additionally, as shown in FIG. 3, the output stage 340 includes various combinations of output multiplexers (OMUXs) and demultiplexers (DEMUXs) can be used to flexibly combine channels in a user beam. For example, the amplified combined signal from the first CACE of FIG. 3, which is a paired CACE module 320-1, is separated in a DEMUX 331-1. One signal from the DEMUX 331-1 is connected to the first user beam $U_1$, and the other signal is sent to an OMUX 331-2 to be combined with a signal from the second CACE 320-2. The output of the OMUX 331-2 is connected to the second user beam $U_2$ allowing it to flexibly increase or decrease its capacity by transferring the capacity from $U_1$.

Also, the outputs of CACEs can be combined to flexibly insert a channel into an unoccupied part of an output band. For example, a user beam may be able to transmit frequencies within an output band 19.7 to 20.2 GHz, and may originally be allocated 250 MHz bandwidth within this output band. A channel with 250 MHz bandwidth can be provided by a first CACE. Later, if the user beam requires additional bandwidth, for example an additional 125 MHz, a second CACE can provide a channel with the additional 125 MHz, and can be tuned to place the additional 125 MHz bandwidth anywhere within the unoccupied part of the 19.7-20.2 GHz band, by step increase or decrease of LO2 with a corresponding step decrease or increase in LO1 to maintain the same input channel centre frequency. The outputs of the first and second CACEs can be combined and sent to the user beam.

By providing a plurality of different combinations of OMUXs and DEMUXs in the output stage, a plurality of downlink beams can be formed that include different channel combinations, i.e. different combinations of the signals selected and converted by the CACEs. Because any CACE can select signals from any frequency range within the received signal, provided the channel filter in the CACE can be set to the required bandwidth, any combination of signals can be routed to a particular downlink beam. Therefore embodiments of the present invention which make use of CACEs with variable high-power amplifiers and combinations of OMUXs/DEMUXs can provide a multibeam satellite communications payload which can flexibly utilize satellite resources such as bandwidth, spectrum and power between beams, insert a channel anywhere within the downlink beam, and selectively route any input channel to any user beam of a Gateway. Signals can be flexibly routed by controlling one or more CACEs to select signals from a different frequency range, i.e. a different channel, if required.

Figure 4:
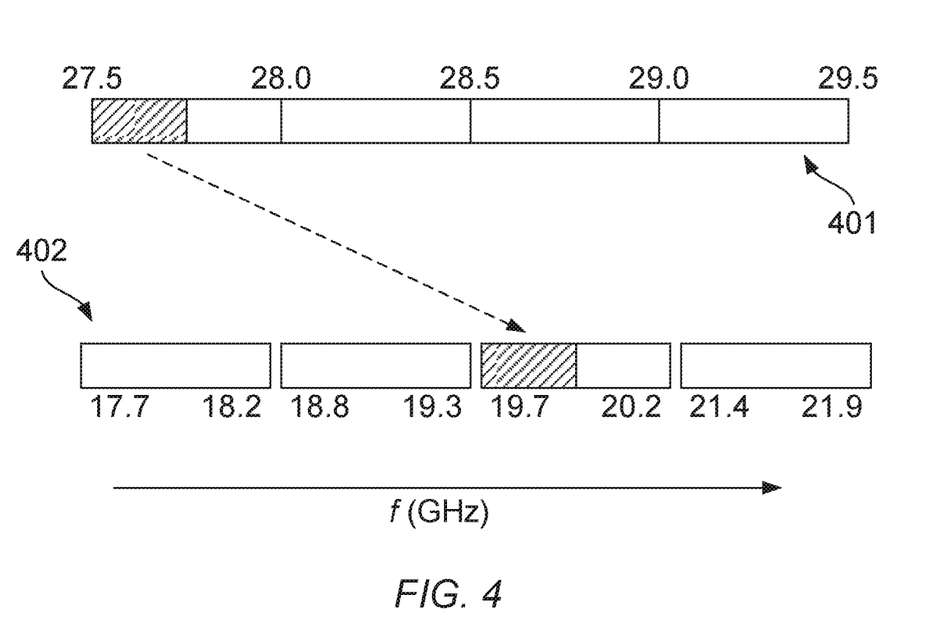
FIG. 4 illustrates an example of selecting signals from a first frequency range in an input frequency band and converting the selected signals to a required output frequency, according to an embodiment of the present invention.

Referring now to FIG. 4, an example of selecting signals from a first frequency range in an input frequency band and converting the selected signals to a required output frequency is illustrated, according to an embodiment of the present invention. In the example shown in FIG. 4, a received GW signal 401 has a total of 2 GHz capacity between 27.5 and 29.5 GHz, for a single polarisation. Signals received from the GW are used for user beams with frequencies 402 in the ranges 17.7-18.2 GHz, 18.8-19.3 GHz, 19.7-20.2 GHz and 21.4-21.9 GHz. As described above, embodiments of the present invention can flexibly route any portion of the received GW signal to any user beam as required. That is, any CACE can tune to any input channel and route it to the required output frequency band of the beam to which the tuned CACE is connected.

For instance, signals received in the 250 MHz channel at 27.5 to 27.75 GHz can be routed to the downlink beam at 19.7 to 19.95 GHz, as shown in FIG. 4. Alternatively, the same input signals at 27.5 to 27.75 GHz could be routed to any other user beams at any of the downlink frequencies shown in FIG. 4, simply by tuning the CACE connected to the corresponding downlink beam to tune to the 27.5 to 2.75 GHz channel. Therefore frequencies originally routed to one of the downlink beams can be rerouted to another beam if required. Frequencies can be shared between different gateways and different polarizations when interconnectivities of a plurality of CACEs are implemented, as an example 320-3 and 320-5 in FIG. 3. For example, over the lifetime of the satellite, the resource demands of a gateway may increase, whilst the resource demands of another gateway may be diminishing. In such situations, systems according to embodiments of the present invention can allow resources to be reallocated as required, while the satellite is in-orbit.

In addition to the above-described advantages, embodiments of the present invention can allow flexible frequency reuse between downlink beams. Frequency reuse refers to simultaneous use of the same frequencies in separate beams, which can be possible by spatial separation of the beams and/or by using different polarisations for the separate beams. Flexible frequency reuse may be required, for example, if the satellite is moved to a new location. It is possible that frequencies previously used in a downlink beam might interfere with existing services in the new location, or with existing services in a spatially adjacent beam using the same polarisation. In this case, the output frequencies in the downlink beam can be changed by retuning a CACE connected to the downlink beam, to switch to output frequencies that do not conflict with existing services. An example of flexible frequency reuse will now be described with reference to FIGS. 6 and 7.

Figure 6:
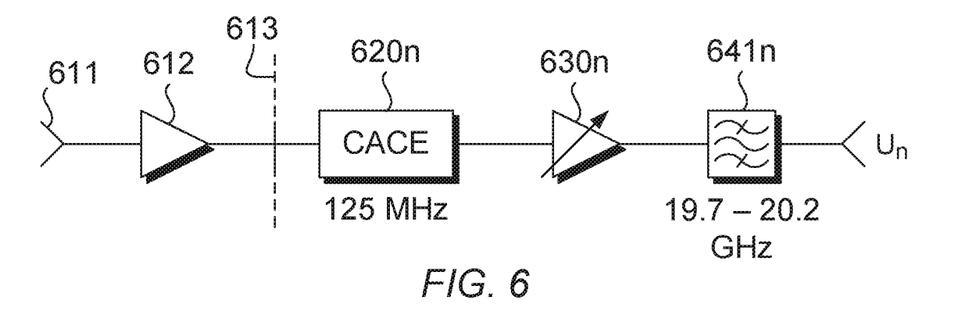
FIG. 6 illustrates part of a satellite payload which forms a particular downlink beam, according to an embodiment of the present invention.

FIG. 6 illustrates the part of the satellite payload which forms a particular user beam, $U_n$. As with the systems of FIGS. 1 and 3, a GW signal is received by an uplink antenna 611, amplified by an LNA 612, sent to a CACE 620n via a signal splitter 613, amplified by a variable-power amplifier 630n, filtered by an output filter 641n and transmitted in a downlink beam $U_n$ formed by an antenna. In the present example, the bandwidth of the channel filter in the CACE 620n is set to 125 MHz and the output filter 641n connected to the CACE 620n has a larger bandwidth than the channel filter, in this case 500 MHz. Because the bandwidth of the output filter is wider than the channel bandwidth, the CACE can be tuned to position the 125 MHz channel anywhere within the 500 MHz passband of the output filter 641n.

Figure 7:
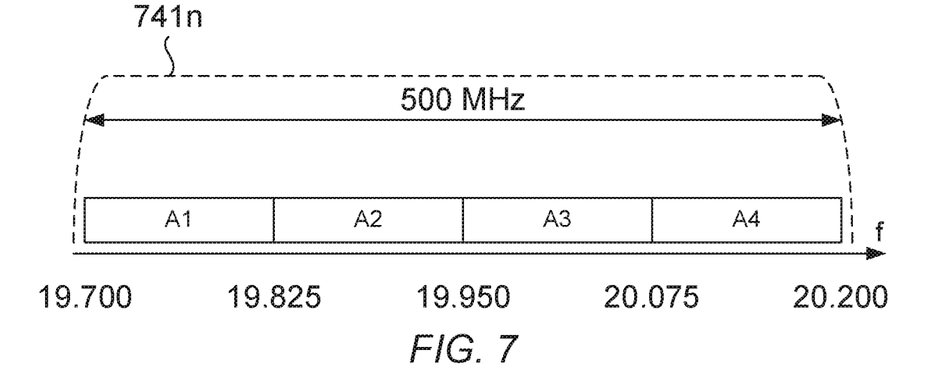
FIG. 7 illustrates channel positions selectable in the downlink beam formed by the apparatus of FIG. 6.

This is shown in more detail in FIG. 7, which illustrates channel positions selectable in the downlink beam formed by the apparatus of FIG. 6. Specifically, the passband 741n of the output filter 641n covers a range of 500 MHz from 19.7 to 20.2 GHz. Four possible positions of the 125 MHz channel output by the CACE 620n are shown, labelled A1 to A4. For example, when the satellite is originally put into service, the 125 MHz channel of downlink beam $U_n$ may be transmitted in band A4, i.e. in the range 20.075 to 20.2 GHz. However, if the satellite subsequently moves to a new location and the downlink beam $U_n$ can no longer use these frequencies, the CACE 620n can be retuned to use a different band, for example band A1 between 19.7 to 19.825 GHz.

Figure 8:
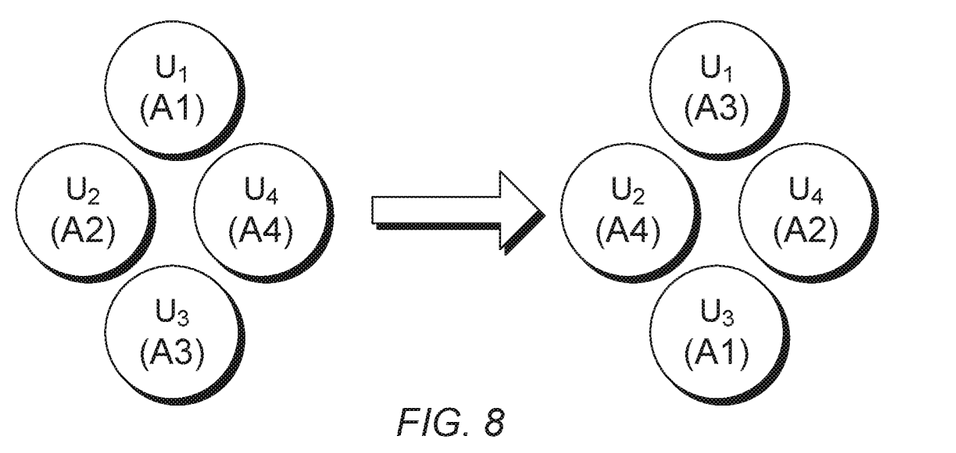
FIG. 8 illustrates flexible frequency reuse patterns for a plurality of user beams, according to an embodiment of the present invention.

Flexible frequency reuse patterns for a plurality of user beams are illustrated in FIG. 8. On the left-hand side of FIG. 8, the frequency reuse pattern of four user beams $U_1$ to $U_4$ is illustrated with their original frequency allocations, using the bands A1 to A4 shown in FIG. 7. Each user beam $U_1$ to $U_4$ may be formed using apparatus as shown in FIG. 6. At some point after entering service, the satellite may be moved to a new location where, for example, beam $U_1$ can no longer use the frequencies in band A1 because these would interfere with an existing service at the new location. Similarly, there could be constraints for the use of original frequency allocations for other beams. However, the CACE supplying each output beam can be retuned to a new frequency band as shown in the right-hand diagram of FIG. 8. Since beam $U_1$ now uses frequencies in band A3 instead of A1, interference with the existing service can be avoided. The frequency-reuse pattern has thus been changed, retaining the original capacity by reuse of the frequencies.

As described above, embodiments of the present invention can allow flexible frequency reuse by employing an output filter for a downlink beam that has a wider bandwidth than the channel filter in the CACE supplying the beam. This allows the output frequency of the beam to be retuned to a different frequency band. However, in other embodiments, the output filter may have the same bandwidth as the channel bandwidth, meaning that the output frequency range of the beam cannot be retuned. In this case, reconfigurable/steerable antennae can be used to redirect a user beam if required, e.g. if the frequencies used by that beam would interfere with other services at that location. In the case of reconfigurable/beam steerable antennae, beam weights are changed to steer the beam to suit the required frequency reuse patterns of the beams.

Figure 9:
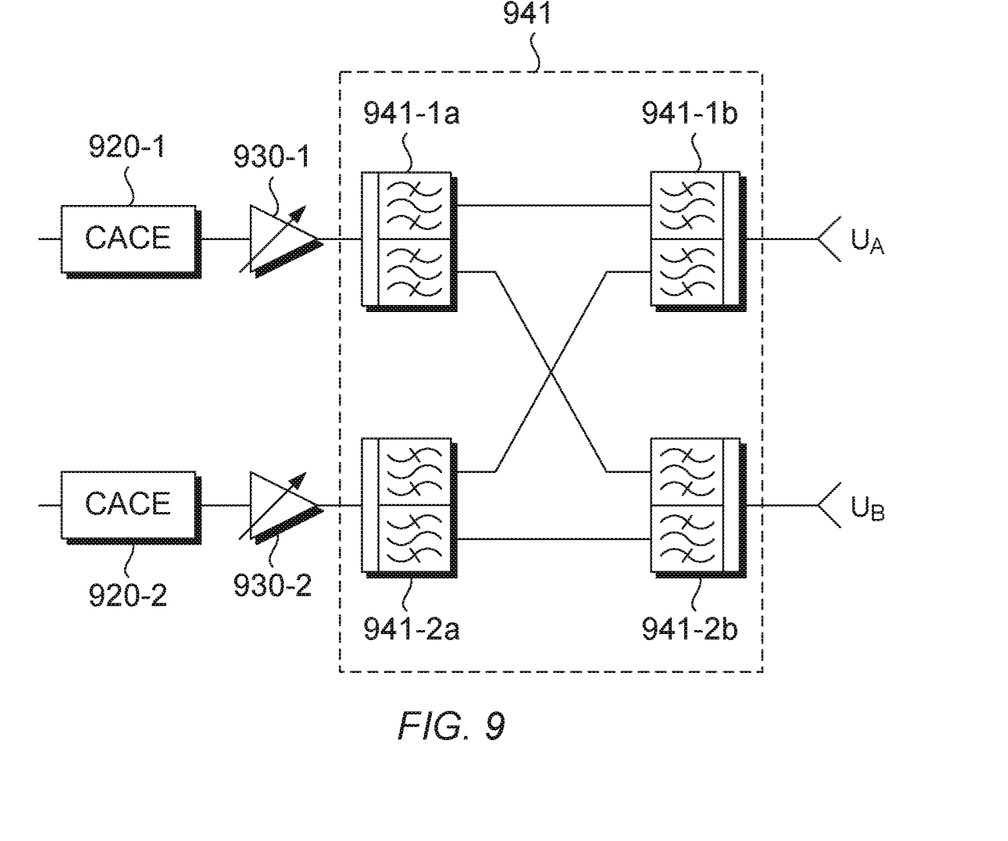
FIG. 9 illustrates a system including cross-connected OMUXes and DEMUXes for flexibly changing a frequency reuse pattern.

The example shown in FIG. 8 is a 4-cell reuse pattern. However, embodiments of the present invention can be applied to any number of cell reuse patterns, i.e. any number of downlink beams, to flexibly change the frequency reuse pattern in the in-orbit service location or when the satellite is moved to a different location, without any changes to the output section of the repeater feeding to the input of the antenna Also, other embodiments of the present invention can provide flexible frequency reuse patterns without the use of wideband filters. Referring now to FIG. 9, a system including cross-connected OMUXes and DEMUXes for flexibly changing a frequency reuse pattern is illustrated, according to an embodiment of the present invention. In this embodiment, two downlink user beams $U_A$ and $U_B$ are illustrated, but the skilled person will appreciate that similar embodiments may be adapted for any number of downlink beams by providing additional CACEs and cross-connected DEMUXes/OMUXes as required. Also, in FIG. 9 the input stage is not shown, but in general the CACEs 920-1, 920-2 may both receive the same signal from the input stage or may receive different signals, i.e. may receive signals of the same or opposite polarisations, and may receive signals from the same or different gateways.

In the embodiment of FIG. 9, two CACEs 920-1, 920-2 are connected to two downlink beams $U_A$, $U_B$ by a flexible frequency-reuse module 941. As described above, the user beams $U_A$, $U_B$ may be formed by separate antennae or by the same antenna. The flexible frequency-reuse module 941 is configured such that by retuning the CACEs 920-1, 920-2, the frequency reuse pattern of the user beams $U_A$, $U_B$ can be changed in-orbit.

In more detail, the flexible frequency-reuse module 941 comprises two demultiplexers DEMUXes 941-1a, 941-2a, and two output multiplexers OMUXes 941-1b, 941-2b. Each DEMUX 941-1a, 941-2a includes a plurality of outputs and an input connected to one of the CACEs 920-1, 920-2. Each OMUX 941-1b, 941-2b includes a plurality of inputs and an output connected to one of the user beams $U_A$, $U_B$. Also, the DEMUX outputs and the OMUX inputs are connected such that each DEMUX 941-1a, 941-2a is connected to each one of the OMUXes 941-1b, 941-2b.

Because each DEMUX 941-1a, 941-2a is connected to each OMUX 941-1b, 941-2b, each CACE 920-1, 920-2 can route a signal to any of the user beams $U_A$, $U_B$ by tuning the output frequency so that it falls within the passband of the particular DEMUX output that is directed to the required beam, i.e. that is connected to the OMUX 941-1b, 941-2b feeding that beam. Furthermore, it is an inherent feature of OMUXes that each input must accept a different frequency range. Therefore when the user beam $U_B$, for example, receives a signal from the first CACE 920-1 via the first DEMUX 941-1a, the signal will necessarily be different in frequency to a signal that would be received from the second CACE 920-2 via the second DEMUX 920-2. Hence the occupied frequencies in each user beam can be changed in-orbit by tuning a different one of the CACEs to provide the signal for that user beam.

The skilled person will appreciate that it would in theory be possible to omit the DEMUXes and instead provide a dedicated plurality of CACEs to feed each OMUX. However, such an arrangement would require a large number of redundant CACEs since it may be that only a single CACE would be used for any given beam at any given time. By employing the DEMUXes and the cross-coupling arrangement as shown in FIG. 9, fewer CACEs can be used.

Also, in the present embodiment, the DEMUXes 941-1a, 941-2a are connected to the CACEs 920-1, 920-2 via variable-power amplifiers 930-1, 930-2, and the OMUXes 941-1b, 941-2b are connected directly to the user beams $U_A$, $U_B$, i.e. to the antenna for forming each user beam. However, in other embodiments the CACEs can be connected to the flexible frequency-reuse module and the amplifiers can be provided after the flexible frequency-reuse module, i.e. between the flexible frequency-reuse module and the antennae.

Embodiments of the present invention have been described which can allow multibeam satellite systems to flexibly support high capacity traffic by using a plurality of downlink beams and a limited number of uplink beams, such as Gateways. Bandwidth and power can be flexibly shared between user downlink beams within a Gateway, as well as between the Gateways. Furthermore, channel phase noise can be kept at or below acceptable limits, particularly when a CACE structure such as the one in FIG. 1 is employed.

Figure 5:
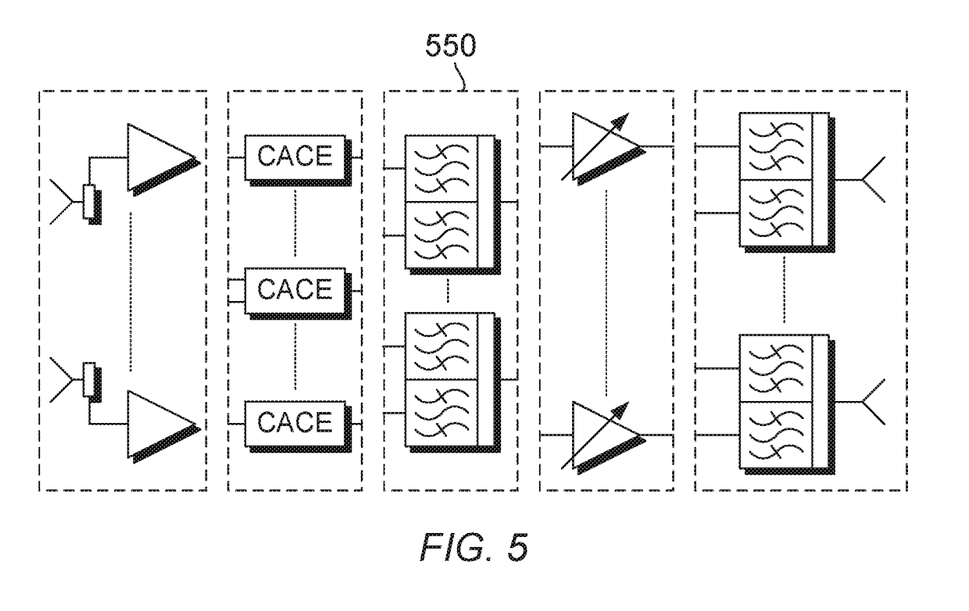
FIG. 5 illustrates a system for use in the return path payload of a communications satellite, according to an embodiment of the present invention.

Although the Forward path payload is illustrated in FIG. 3 for multibeam flexible satellite communications payload, the skilled person will appreciate that similar principles may also be applied to the Return path payload. An example of a Return path payload according to an embodiment of the present invention is illustrated in FIG. 5. In many aspects the Return path embodiment is similar to the Forward path embodiment, except that the uplink signals are received from users and the downlink signals are sent to gateways. In order to combine many user signals into a single downlink GW beam, the Return path system further includes a channel multiplexing stage 550 for multiplexing the signals from a plurality of CACEs and sending the multiplexed signal to an antenna of the output stage.

In addition, embodiments of the present invention have been described in which a mixed LO signal is used for downconversion, as shown in FIG. 2. However, in other embodiments the mixed LO signal can be used in upconversion instead. For example, a first LO signal can be used for downconversion to the IF, and a second LO signal obtained by mixing the first LO signal with a third LO signal can be used for upconversion from the IF to the output frequency band, the second LO signal being the mixed LO signal. In this example, the first LO signal is used in both downconversion and upconversion and hence phase noise introduced by the first LO signal during downconversion is cancelled during upconversion.

Whilst certain embodiments of the present invention have been described above, the skilled person will understand that many variations and modifications are possible without departing from the scope of the invention as defined in the accompanying claims. Any features of any described embodiment may be used in combination with any features of any other described embodiment.

The invention claimed is:

1. A system for use in a communications satellite to route signals from a received multiplexed signal to a plurality of downlink beams, the system comprising a plurality of frequency-conversion modules each configured to process selected signals in a first frequency range from the multiplexed signal received in an input frequency range, each frequency-conversion module comprising:

a first mixer arranged to mix the received signal with a first local oscillator LO signal to down-convert the received signal so that a signal within the received signal at a center frequency of the first frequency range is converted to an intermediate frequency IF;

a channel filter arranged to filter the mixed signal to output an analogue signal, the channel filter having a passband with a center frequency at the IF, wherein the channel filter includes a plurality of filters each having a different predetermined bandwidth centered at the IF, and the channel filter is arranged to be switchable between the plurality of filters to select a filter having a bandwidth according to a bandwidth of the first frequency range in which the selected signals are comprised; and a second mixer arranged to mix the filtered IF signal with a second LO signal to up-convert the IF signal to an output frequency range, wherein one of the first and second LO signals is a mixed LO signal obtained by mixing the other one of the first and second LO signals with a third LO signal, and the third LO signal and said other one of the first and second LO signals are independently controllable to select a different frequency range as the first frequency range by changing the frequency that is down-converted to the intermediate frequency by the first mixer, and to change the output frequency range to which the selected signals are up-converted by the second mixer such that the center frequency of the first frequency range is translated to a different value for a center frequency of the output frequency range, wherein the system comprises an output stage arranged to receive the converted signals and form the plurality of downlink beams, each downlink beam including one or more of the converted signals, the output stage comprising at least one demultiplexer DEMUX including an input and a plurality of outputs, the DEMUX input being arranged to receive one of the converted signals and each DEMUX output being connected to a different one of the downlink beams, such that said one of the converted signals can be routed to the downlink beam connected to one of the DEMUX outputs by controlling one of the frequency-conversion modules to tune the converted signal to a passband frequency range of said one of the DEMUX outputs.

2. The system of claim 1, wherein the second LO signal is controllable to change the output frequency range to which the IF signal is up-converted.

3. The apparatus system of claim 1, further comprising:
a channel amplifier arranged to amplify the filtered IF signal before the filtered IF signal is up-converted to the output frequency range.

4. The system of claim 1, further comprising:
an input stage arranged to receive and amplify the multiplexed signal, and send the received signal to the plurality of frequency-conversion modules; and
a plurality of amplifiers, each connected to at least one of the frequency-conversion modules to amplify the upconverted signal output by the at least one frequency-conversion module and send the amplified converted signal to the output stage.

5. The system of claim 4, wherein the plurality of amplifiers are variable-power amplifiers, each arranged to amplify a converted signal output by one of the plurality of frequency-conversion modules to a transmit power level according to a bandwidth occupancy of the converted signal.

6. The system of claim , wherein the plurality of frequency-conversion modules includes a plurality of first frequency-conversion modules arranged to receive a first received signal and a plurality of second frequency-conversion modules arranged to receive a second received signal, the system configured to:
combine the converted signal output by one of the first frequency-conversion modules with the converted signal output by one of the second frequency-conversion modules and send the combined signal to one of the plurality of amplifiers.

7. The system of claim 6, wherein the input stage is arranged to separate the received signal into the first and second received signals, the first received signal being a polarized signal and the second received signal being a signal having an opposite polarization to the first received signal.

8. The system of claim 6, wherein the input stage comprises at least one antenna arranged to receive the first received signal from a first source and the second received signal from a second source.

9. The system of claim 4, wherein the output stage includes an antenna for forming one of the downlink beams and a filter arranged to filter one of the amplified signals and send the filtered amplified signal to the antenna, the filter having a first bandwidth, and wherein the amplified signal is a signal received from one of the frequency-conversion modules arranged to filter the IF signal with a second bandwidth smaller than the first bandwidth, such that the frequency-conversion module can be controlled to retune the output frequency within the first bandwidth range of said one of the downlink beams.

10. The system of claim 1, wherein the output stage further comprises:
an output multiplexer OMUX including a plurality of inputs and an output, the OMUX output being connected to one of the downlink beams and each OMUX input being arranged to receive one of the converted signals, such that a plurality of the converted signals can be combined and transmitted in the downlink beam connected to the OMUX output.

11. The system of claim 1, wherein the output stage includes a flexible frequency-reuse module connecting a first plurality of the frequency-conversion modules to a first plurality of the downlink beams ($U_A$, $U_B$) such that the first plurality of frequency-conversion modules can be retuned to change a frequency reuse pattern of the first plurality of downlink beams, the flexible frequency-reuse module comprising:
a plurality of demultiplexers DEMUXes each including a plurality of outputs and an input connected to one of the first plurality of frequency-conversion modules; and
a plurality of output multiplexers OMUXes each including a plurality of inputs and an output connected to one of the first plurality of downlink beams,
wherein the DEMUX outputs and the OMUX inputs are connected such that each DEMUX is connected to each one of the OMUXes.

12. The system of claim 1, wherein the output stage includes at least one antenna for forming the downlink beams, the at least one antenna being arranged to be reconfigurable or steerable to redirect the downlink beams.

13. A method for use in a communications satellite to route signals from a received multiplexed signal to a plurality of downlink beams, the system comprising a plurality of frequency-conversion modules each configured to process selected signals in a first frequency range from the multiplexed signal received in an input frequency range, the method comprising:
mixing the received signal with a first local oscillator LO signal so that a signal within the received signal at a center frequency of a selected frequency range is down-converted to an intermediate frequency IF;
selecting one of a plurality of filters each having a different predetermined bandwidth centered at the IF, wherein the plurality of filters are included in a channel filter;
filtering the IF signal using the selected filter to output an analogue signal wherein the channel filter is arranged to be switchable between the plurality of filters to select a bandwidth according to a bandwidth of the first frequency range in which the selected signals are comprised; and
mixing the filtered IF signal with a second LO signal to up-convert the filtered signal to an output frequency range;
wherein one of the first and second LO signals is a mixed LO signal obtained by mixing the other one of the first and second LO signals with a third LO signal, and the method further comprises:
independently controlling the third LO signal and said other one of the first and second LO signals to select a different frequency range as the first frequency range by changing the frequency that is down-converted to the intermediate frequency, and to change the output frequency range to which the selected signals are up-converted such that the center frequency of the first frequency range is translated to a different value for a center frequency of the output frequency range;

using an output stage to form the plurality of downlink beams, each downlink beam including one or more of the converted signals, the output stage comprising at least one demultiplexer DEMUX including an input and a plurality of outputs, the DEMUX input being arranged to receive one of the converted signals and each DEMUX output being connected to a different one of the downlink beams; and controlling one of the frequency-conversion modules to tune a respective one of the converted signals to a passband frequency range of one of the DEMUX outputs such that said one of the converted signals is routed to the downlink beam connected to said one of the DEMUX outputs.

* * * * *